United States Patent
Chen et al.

(10) Patent No.: US 11,482,253 B1
(45) Date of Patent: Oct. 25, 2022

(54) PER HEAD, PER PROFILE FINALIZE TO MOVE REPEATABLE RUNOUT COMPENSATION VALUES TO NAND MEMORY

(71) Applicant: Western Digital Technologies, Inc., San Jose, CA (US)

(72) Inventors: Zaifeng Chen, Rancho Palos Verdes, CA (US); Chuanwen Ji, Irvine, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/506,660

(22) Filed: Oct. 20, 2021

(51) Int. Cl.
  *G11B 20/20* (2006.01)
  *G11B 20/10* (2006.01)
  *G11B 5/012* (2006.01)

(52) U.S. Cl.
  CPC ........ *G11B 20/10388* (2013.01); *G11B 5/012* (2013.01)

(58) Field of Classification Search
  CPC ............ G11B 20/10388; G11B 5/5543; G11B 20/1816; G11B 5/596; G11B 20/20; G11B 5/5539; G11B 5/54
  USPC .......................................... 360/75, 76, 77.08
  See application file for complete search history.

(56) References Cited

U.S. PATENT DOCUMENTS

| 7,595,955 B2 * | 9/2009 | Hosono .............. G11B 5/59688 360/76 |
| 10,854,290 B1 | 12/2020 | Wu et al. |

OTHER PUBLICATIONS

Western Digital, Technical Brief: Reimagining HDDs with OptiNAND™ Technology, Aug. 2021, 5 pages, Western Digital Corporation, downloaded at https://documents.westerndigital.com/content/dam/doc-library/en_us/assets/public/western-digital/collateral/tech-brief/tech-brief-reimagining-hdds-with-optinand-technology.pdf.

* cited by examiner

*Primary Examiner* — Nabil Z Hindi
(74) *Attorney, Agent, or Firm* — John D. Henkhaus

(57) ABSTRACT

Processing hard disk drive (HDD) data track repeatable runout (RRO) compensation data includes, for each read-write head constituent to the HDD, and for each data track on which the read-write head operates, saving RRO compensation data to single-level cell (SLC) area of a NAND memory component, and finalizing the RRO data before processing the next read-write head of the HDD, thereby minimizing the SLC area used. Finalizing the RRO data may include sorting the RRO data for the read-write head in the SLC area, moving the sorted RRO data from the SLC area to triple-level cell (TLC) or other higher-level cell area of the NAND, and then erasing the RRO data from the SLC area to free up that memory space, thereby reducing the risk of wearing out the TLC area.

18 Claims, 2 Drawing Sheets

PER HEAD, PER PROFILE FINALIZE TO MOVE REPEATABLE RUNOUT COMPENSATION VALUES TO NAND MEMORY

FIELD OF EMBODIMENTS

Embodiments of the invention may relate generally to data storage devices such as hard disk drives and particularly to approaches to processing and storing repeatable runout (RRO) compensation value data to onboard NAND (NOT AND) memory.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Increasing areal density (a measure of the quantity of information bits that can be stored on a given area of disk surface) is one of the ongoing goals of HDD technology evolution, and has led to the necessary development and implementation of various means for reducing the disk area needed to record a bit of information. In one form, this goal manifests in the use of a recording paradigm referred to as shingled magnetic recording (SMR), in which the data tracks are written to disk sequentially in a partially overlapping manner similar to shingles on a roof. Furthermore, so-called "XMR" HDDs are being developed which can be used in both CMR (conventional magnetic recording) and SMR modes.

As recording tracks in HDDs become narrower and narrower and bits are recorded smaller and smaller, there is a need for more accurate and sustainable head positioning, sometimes referred to as "track following". One of the factors impairing precise track following is repeatable runout (RRO), which generally refers to the deviation of the head from the theoretical perfect circle of the track, and is a portion of the position error signal (PES) that is repeatable for every spindle revolution. Modern HDDs include servo systems that read and interpret servo bursts on the disk tracks, which contain special data that the head reads and the servo system firmware interprets to determine to which track the head is closest and how far off track center the head is. In HDD manufacturing, RRO needs to be calibrated on every track for each type of track to improve servo performance (e.g., via RRO compensation) and to assist in achieving areal density goals. For XMR drives, there are four "types" of tracks needing RRO calibration: (i) CMR Write track, (ii) CMR Read track, (iii) SMR Write track, and (iv) SMR Read track.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
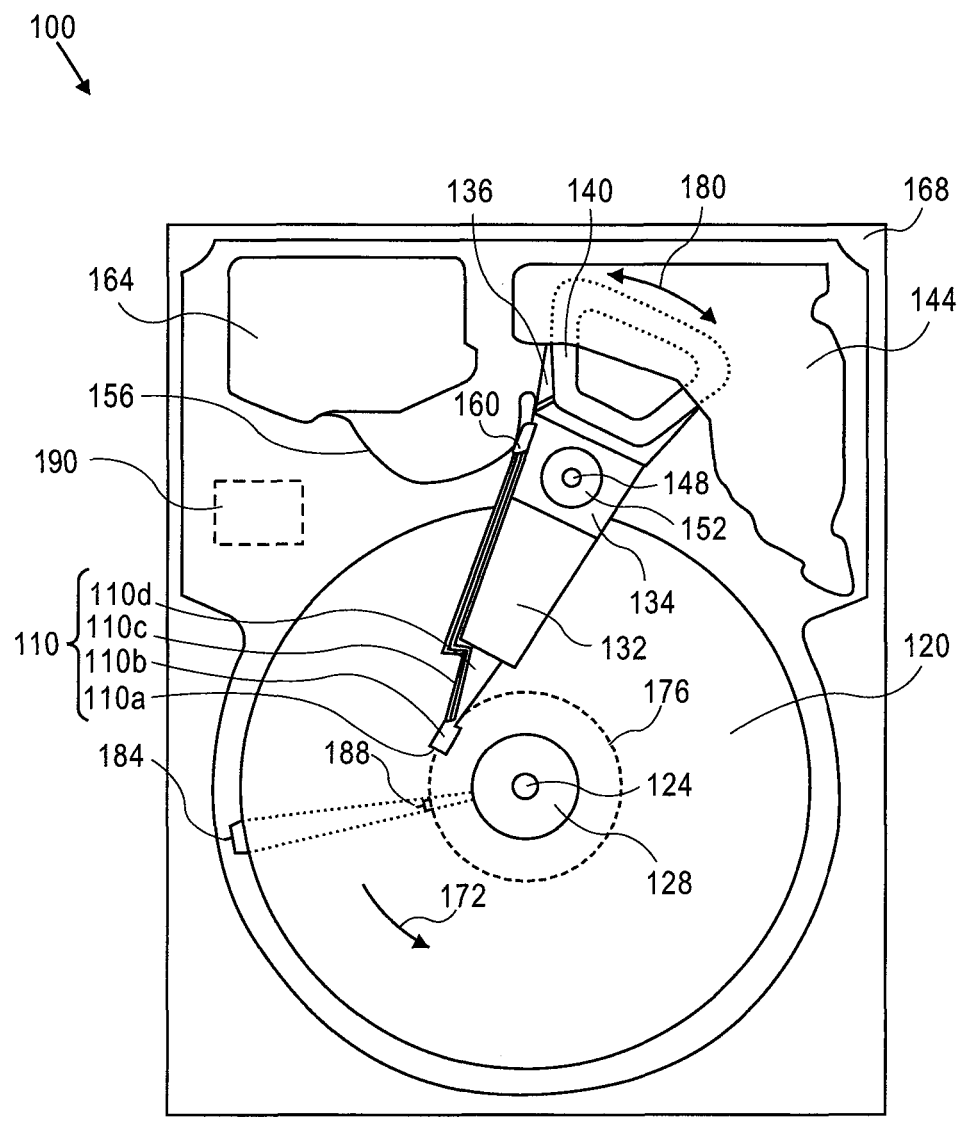
FIG. 1 is a plan view illustrating a hard disk drive (HDD), according to an embodiment.

Generally, approaches to processing repeatable runout (RRO) compensation data are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

Introduction

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that RRO needs to be calibrated on every track for each type of track to improve servo performance (e.g., via RRO compensation) and to assist in achieving areal density goals. This is a time-consuming and costly process, especially in the context of XMR drives, in which there are four "types" of tracks needing RRO calibration: (i) CMR Write track, (ii) CMR Read track, (iii) SMR Write track, and (iv) SMR Read track. One potential approach may be to temporarily save the RRO compensation data (or simply "RRO data") to a dedicated area of one or more disks in the HDD. However, this approach would be time-costly regarding the test time needed to seek to a target data area and to save the RRO data. Furthermore, sorting of such RRO data would also be time-costly due to the intensive accessing of the RRO data from disk.

Certain HDD architectures may utilize dedicated NAND memory, not necessarily for the traditional uses of DRAM (dynamic random access memory) semiconductor memory, such as for booting and/or user data caching, but for improving HDD management functions to gain areal density or for other functional benefits. For example, the NAND memory may be used for storing and thus fast access to the RRO data during HDD operation. In the context of the RRO calibration manufacturing process, each RRO compensation value would ultimately need to be saved into TLC (triple-level cell, stores three bits/cell) area in a NAND memory, for example. However, TLC has limited write cycles and, therefore, there is a risk of damaging TLC memory cells when HDDs are reprocessed repeatedly during development time due to data sorting and read-and-modify operations.

Processing Repeatable Runout Compensation Values in NAND Memory

Continuing with the context of ultimately saving the RRO compensation data into TLC NAND memory, the RRO data may be first temporarily stored in SLC (single-level cell, stores one bit/cell) area, which allows more write cycles than TLC. Generally, SLC offers higher performance, higher P/E (program-erase) cycles and higher data retention margins compared to TLC, while TLC enables three times the amount of storage in the same footprint as SLC. Since SLC space is significantly more expensive than TLC and limited in availability, it is desirable to reduce the size of SLC utilized during the RRO calibration process while still supporting HDD products with high head counts to make such an implementation scalable.

Figure 2:
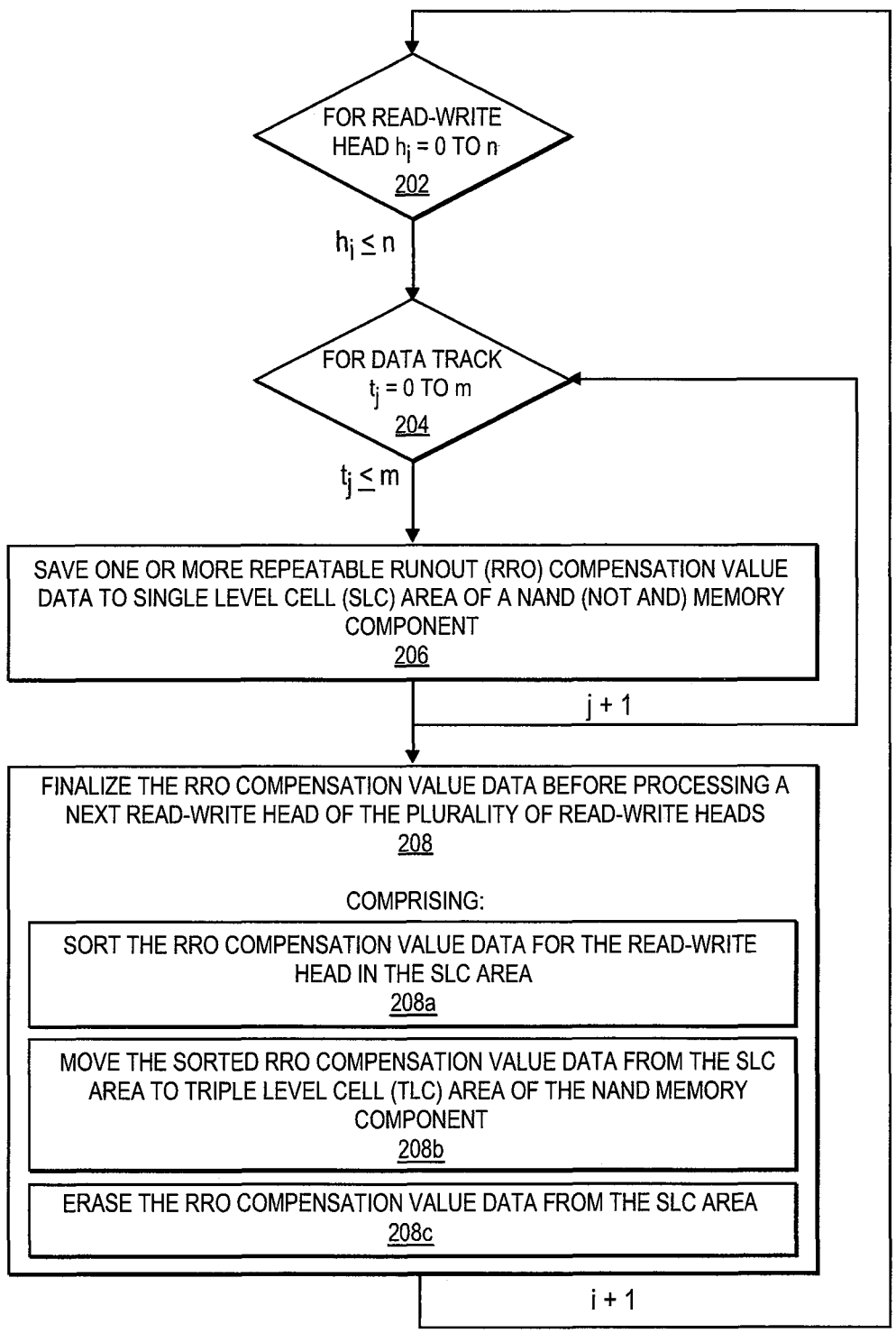
FIG. 2 is a flow diagram illustrating a method for processing hard disk drive (HDD) data track repeatable runout (RRO) compensation data, according to an embodiment.

FIG. 2 is a flow diagram illustrating a method for processing hard disk drive (HDD) data track repeatable runout (RRO) compensation data, according to an embodiment. According to one embodiment, the techniques described herein may be performed by a computing system in response to a processor(s) executing one or more sequences of one or more instructions contained in one or more main memory. Such instructions may be read into the main memory from another computer-readable medium. Execution of the sequences of instructions contained in the main memory causes the processor(s) to perform the process steps described herein. For example, these techniques may be performed within a hard disk drive such as HDD 100 (FIG. 1), such as during manufacturing of the HDD. In alternative embodiments, hard-wired circuitry such as firmware or an application-specific integrated circuit (ASIC) may be used in place of, or in combination with software instructions, to implement embodiments. Thus, embodiments are not limited to any specific combination of hardware circuitry and software.

The terms "computer-readable medium" and "machine-readable medium" if used herein refer to any medium that participates in providing instructions to processor(s) for execution. Such a medium may take many forms, including non-volatile media and volatile media. Non-volatile media includes, for example, HDD(s) and/or SSD(s). Volatile media includes dynamic memory (e.g., dynamic random access memory, or DRAM), such as the main memory. Common forms of computer-readable media include, for non-limiting examples, a hard disk, magnetic tape or any other magnetic medium, a CD-ROM or any other optical medium, a RAM, a FLASH-EPROM or any other memory chip or circuitry, or any other medium from which a computing device can read. Various forms of computer readable media may be involved in carrying one or more sequences of instructions to the processor(s) for execution. For example, the instructions may initially be stored on a memory of a remote computer. The remote computer can load the instructions into its dynamic memory and send the instructions over a communication link. A communication interface of the computing system can receive the data from the communication link and appropriate circuitry can place the data on a bus, which carries the data to the main memory, from which the processor retrieves and executes the instructions.

At diamond block 202, for each read-write head (see, e.g., read-write head 110a of FIG. 1) of a plurality of read-write heads constituent to the HDD (e.g., for read-write head $h_i$ where i=0 to n), processing iteratively moves to diamond block 204. At diamond block 204, for each data track (see, e.g., track 176 of FIG. 1) on which the read-write head operates (e.g., for data track $t_j$ where j=0 to m), processing iteratively moves on to perform the following blocks.

At block 206, one or more RRO compensation value data is saved to single-level cell (SLC) area of a NAND (NOT AND) memory component. For example, during RRO calibration RRO compensation values are determined which represent to the servo system how to compensate for the identified RRO based on the degree of deviation of the head from the theoretical perfect circle of the track. Upon calibrating and storing the RRO compensation value for the current track $t_j$ in the SLC area, the track count is incremented by one (e.g., j+1) and processing continues back to block 204 for the next track for the current head $h_i$. Particularly, the RRO compensation data may be computed for each sector of each track while saving/storing the data on a per-track basis, where multiple tracks of RRO data can be stored in one data block.

At block 208, the RRO compensation value data is finalized, before processing moves on to the next read-write head of the plurality of read-write heads. Upon finalizing the RRO compensation data for all the tracks $t_j$ (where j=0 to m) for the current head $h_i$, the head count is incremented by one (e.g., i+1) and processing continues back to block 202 for the next head $h_i$ (where i=0 to n), and processing continues until all the tracks corresponding to all the heads of the HDD are processed.

According to an embodiment, blocks 206 and 208 are performed for each read-write head (see, e.g., block 202) and for each corresponding track on which each head operates (see, e.g., block 204), for each of a plurality of recording types and a plurality of RRO compensation value types. For example in the context of an XMR type HDD, and according to an embodiment, the plurality of recording types comprises conventional magnetic recording (CMR) and shingled magnetic recording (SMR) recording types, and the plurality of RRO compensation value types comprises Read and Write. Stated otherwise, the saving at block 206 and the finalizing at block 208 are performed iteratively for each data track and for each corresponding read-write head, for each of the aforementioned CMR Read, CMR Write, SMR Read, and SMR Write profiles of RRO compensation.

According to an embodiment, finalizing the RRO compensation value data comprises sorting the RRO compensation value data for the read-write head in the SLC area, at block 208a, and moving the sorted RRO compensation value data from the SLC area to triple-level cell (TLC) area of the NAND memory component, at block 208b. However, the type of memory cell to which the RRO compensation data is moved may vary from implementation to implementation, and the embodiments described herein in reference to TLC area of NAND are for purposes of example. Therefore, at block 208a the sorted RRO compensation data may be moved from SLC area to one or more of MLC (multi-level cell, alternatively, double-level cell, stores two bits/cell), QLC (quad-level cell, stores four bits/cell), PLC (penta-level cell, stores five bits/cell), or any higher dimensional cell memory not yet developed (generally, "higher-level cell"), and still fall within the scope of the embodiments of the invention. According to an embodiment, finalizing the RRO compensation value data further comprises erasing the RRO compensation value data from the SLC area, at block 208c.

The described method provides for minimizing the SLC area used, in that SLC space is needed for only one head of one type of RRO profile rather than for multiple heads and/or multiple profiles (CMR Read, CMR Write, SMR Read, SMR Write) for example, thus utilizing the NAND memory efficiently. Thus, the size of the SLC used is independent of recording types and number of heads and, therefore, is a scalable approach. Furthermore, it is noteworthy that this approach reduces the risk of wearing out TLC NAND (i.e., a valuable resource) in reprocessing HDDs repeatedly.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168. According to an embodiment, the electronic components include a NAND flash memory 190 component or circuitry. NAND flash memory 190 may be configured to store multiple bits within a single NAND cell. Single-level Cell (SLC) stores one bit/cell, while Triple-level Cell (TLC) can store 3 bits/cell. SLC offers higher performance, higher program-erase (P/E) cycles and higher data retention margins compared to TLC, which enables 3× storage in the same footprint as SLC. Application of this NAND technology can enable both SLC for write-heavy operations and TLC and above for read-heavy operations in the same device.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for processing hard disk drive (HDD) data track repeatable runout (RRO) compensation data, the method comprising:
for each read-write head of a plurality of read-write heads constituent to the HDD:
for each data track on which the read-write head operates:
saving one or more RRO compensation value data to single-level cell (SLC) area of a NAND (NOT AND) memory component; and
finalizing the RRO compensation value data before processing a next read-write head of the plurality of read-write heads.

2. The method of claim 1, wherein finalizing the RRO compensation value data comprises:
sorting the RRO compensation value data for the read-write head in the SLC area; and
moving the sorted RRO compensation value data from the SLC area to a higher-level cell area of the NAND memory component.

3. The method of claim 2, wherein finalizing the RRO compensation value data further comprises:
erasing the RRO compensation value data from the SLC area.

4. The method of claim 1, wherein saving and finalizing are performed for each read-write head and for each data track on which the read-write head operates, for each of a plurality of recording types and a plurality of RRO compensation value types.

5. The method of claim 4, wherein:
the plurality of recording types comprises conventional magnetic recording (CMR) and shingled magnetic recording (SMR) recording types; and
the plurality of RRO compensation value types comprises Read and Write.

6. The method of claim 1, wherein:
saving and finalizing are performed for each read-write head and for each data track on which the read-write head operates, for each of a plurality of profiles; and
the plurality of profiles comprises conventional magnetic recording (CMR) Read, CMR Write, shingled magnetic recording (SMR) Read, and SMR Write.

7. A non-transitory computer-readable medium storing one or more sequences of instructions which, when executed by one or more processors, cause performance of:

for each read-write head of a plurality of read-write heads constituent to a hard disk drive:
  for each data track on which the read-write head operates:
    saving one or more RRO compensation value data to single-level cell (SLC) area of a NAND (NOT AND) memory component; and
    finalizing the RRO compensation value data before processing a next read-write head of the plurality of read-write heads.

8. The computer-readable medium of claim 7, wherein the one or more sequences of instructions, when executed by the one or more processors, cause further performance of:
  finalizing the RRO compensation value data comprising:
    sorting the RRO compensation value data for the read-write head in the SLC area; and
    moving the sorted RRO compensation value data from the SLC area to a higher-level cell area of the NAND memory component.

9. The computer-readable medium of claim 8, wherein the one or more sequences of instructions, when executed by the one or more processors, cause further performance of:
  finalizing the RRO compensation value data further comprises:
    erasing the RRO compensation value data from the SLC area.

10. The computer-readable medium of claim 7, wherein the one or more sequences of instructions, when executed by the one or more processors, cause further performance of:
  saving and finalizing are performed for each read-write head and for each data track on which the read-write head operates, for each of a plurality of recording types and a plurality of RRO compensation value types.

11. The computer-readable medium of claim 10, wherein:
  the plurality of recording types comprises conventional magnetic recording (CMR) and shingled magnetic recording (SMR) recording types; and
  the plurality of RRO compensation value types comprises Read and Write.

12. The computer-readable medium of claim 1, wherein the one or more sequences of instructions, when executed by the one or more processors, cause further performance of:
  saving and finalizing are performed for each read-write head and for each data track on which the read-write head operates, for each of a plurality of profiles comprising conventional magnetic recording (CMR) Read, CMR Write, shingled magnetic recording (SMR) Read, and SMR Write.

13. A data storage device comprising the computer-readable medium of claim 7.

14. A hard disk drive comprising the computer-readable medium of claim 7.

15. A data storage device (DSD) comprising:
  a NAND (NOT AND) flash memory component;
  means for executing machine-executable instructions;
  means for storing one or more sequences of machine-executable instructions which,
    when executed by the one or more processors, cause performance of:
  for each read-write head of a plurality of read-write heads constituent to the DSD:
    for each data track on which the read-write head operates:
      saving one or more RRO compensation value data to single-level cell (SLC) area of the NAND flash memory component; and
    finalizing the RRO compensation value data before processing a next read-write head of the plurality of read-write heads.

16. The DSD of claim 15, wherein the one or more sequences of instructions, when executed by the one or more processors, cause further performance of:
  finalizing the RRO compensation value data comprising:
    sorting the RRO compensation value data for the read-write head in the SLC area; and
    moving the sorted RRO compensation value data from the SLC area to a higher-level cell area of the NAND flash memory component.

17. The DSD of claim 16, wherein the one or more sequences of instructions, when executed by the one or more processors, cause further performance of:
  finalizing the RRO compensation value data further comprising:
    erasing the RRO compensation value data from the SLC area.

18. The DSD of claim 15, wherein the one or more sequences of instructions, when executed by the one or more processors, cause further performance of:
  saving and finalizing are performed for each read-write head and for each data track on which the read-write head operates, for each of a plurality of profiles comprising conventional magnetic recording (CMR) Read, CMR Write, shingled magnetic recording (SMR) Read, and SMR Write.

* * * * *